Jan. 4, 1927.

H. GLOVER 1,613,270

SLIP-ON REPAIR TOP FOR AUTOMOBILES

Filed August 31, 1925

Inventor

HUBERT GLOVER

By

Attorney

Patented Jan. 4, 1927.

1,613,270

UNITED STATES PATENT OFFICE.

HUBERT GLOVER, OF BOYLES, ALABAMA.

SLIP-ON REPAIR TOP FOR AUTOMOBILES.

Application filed August 31, 1925. Serial No. 53,520.

My invention relates to a repair cover for the top of automobiles which is distinguished by the fact that it is designed and adapted to be slipped on over the old top and when applied to fit snugly in place ready at all times to be removed and yet at all times held firmly in position without requiring skilled labor to apply it or any tacking or nailing to hold it.

More particularly, my invention contemplates the designing of a flexible water-proof cover having a marginal downturned edge shaped to fit snugly over the automobile top to be covered and which is thus adapted to be made and sold in standard sizes for standard makes of cars.

My invention is further characterized by the provision in the downturned edge of a stiffening or reinforced wire, the edge and wire being adapted to fit down over and take a purchase under the bead or drip molding on closed cars and truck tops, and to hold the edge snugly against the car top so as to present an attractive appearance.

My invention is further characterized by the provision at the back end of the cover of a spring or tension member incorporated in the edge and connected to the ends of the reinforcing wire, thereby serving to hold the reinforcing and retaining wire under tension at all times.

My invention further comprises the novel details of construction and arrangements of parts, which in their preferred embodiment only are illustrated in the accompanying drawings which form a part of this specification, and in which:—

Similar reference numerals refer to similar parts throughout the drawings.

Figure 1:
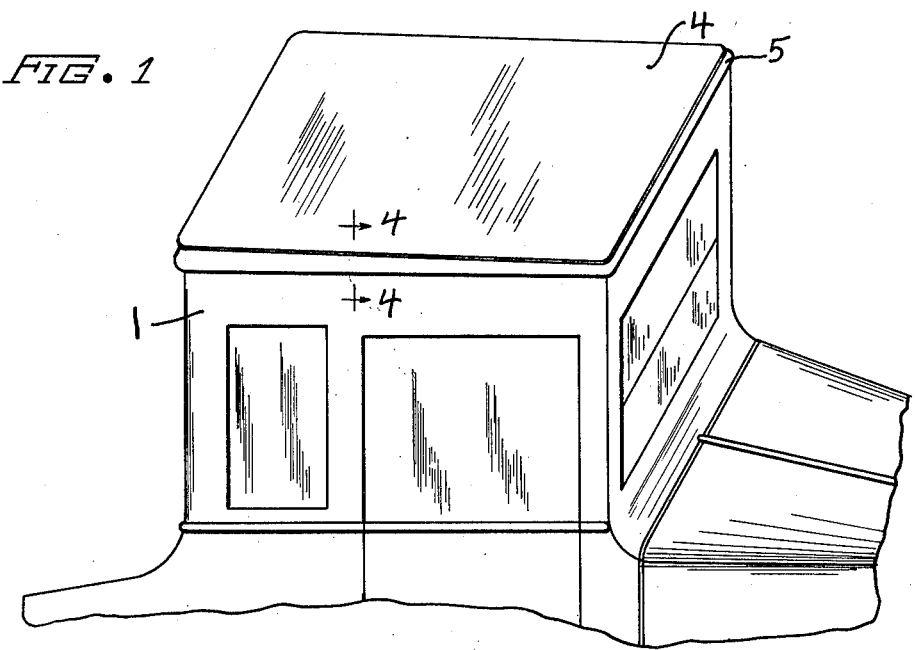
Fig. 1 is a perspective view of a closed car equipped with my improved slip-on cover.
Figure 2:
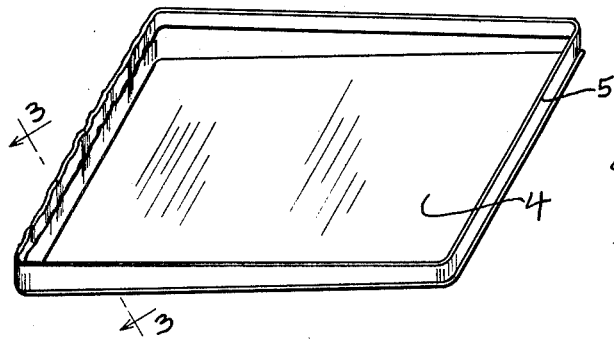
Fig. 2 is a bottom perspective view of the cover detached.
Figure 3:
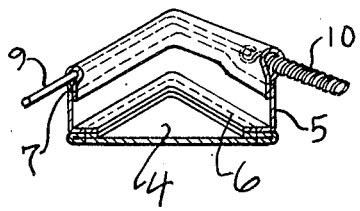
Fig. 3 is an enlarged detail view of a rear corner of the cover showing the reinforcing wire at one side and the tension spring at the other.
Figure 4:
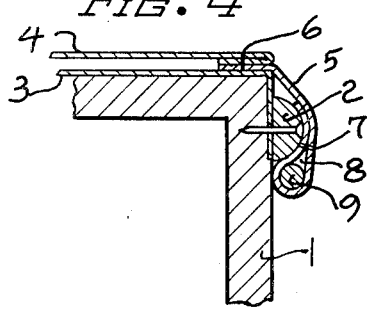
Fig. 4 is a cross-sectional view showing the manner in which the cover is interlocked with the bead.

I have illustrated my invention in connection with a coupé but it is applicable to any closed car or truck. The coupé as at present manufactured is provided with a body 1 having a standard drip mold or bead 2 which is applied over the edge of the original top cover 3.

My improved slip-on cover comprises a center piece 4, cut to shape corresponding to the top of the automobile or truck body to be covered and I attach a marginal edge 5 by means of a seam 6 about the outer edge of the cover 4, this edge 5 being shaped to provide corners which are disposed substantially at right angles to the plane of the center panel 4 when the cover is applied. The bottom of the edge 5 is upturned and stitched at 7 to provide a marginal pocket 8 in which I introduce a reinforcing cord, cable or wire 9. This wire passes across the front edge of the cover and around the front corners and along each side and about the rear corners and its free ends are connected to an elastic member 10, preferably a coil spring, which is shaped so as not to make the cover unsightly and which is adapted, like the wire, to fit under the drip mold or bead when the cover is applied. To apply the cover, its front edge is caught over the front edge of the top and the reinforcing wire 9 is caused to engage under the bead or mold 2 and after fitting the cover over the front corners of the automobile top, one side edge of the cover is drawn snugly against the adjacent side of the top and its rear corner edge is brought around the rear corner edge of the top. The other rear corner of the cover is then grasped, the spring is stretched and this corner is drawn down and snapped over the other rear corner of the top and when released the spring draws both itself and the wire snugly into position under the drip mold or bead and stretches the slip-on cover tightly over the automobile top and holds it securely in position, so that there will be no tendency for it to blow off or to flutter, and yet, if desired, it can be readily removed. The pocket 8 is sewn to snugly fit the wire 9 and is enlarged to loosely fit over the spring 10, thus permitting the latter to contract the lower edge freely.

It is to be understood that the detail structure of my device may be variously modified from that shown without departing from the principles underlying my invention, and it will be apparent that my device accomplishes certain important advantages in that it provided a top cover, capable of application and removal without skilled help or expense; which is collapsible so that it can be shipped in compact containers; and which does not require to be attached to the automobile top and therefore eliminates the replacement of defective parts of the top frame.

Having thus described my invention, what I claim as new and desire to secure by Letters Patent, is:—

1. A slip-on cover for automobile tops having a drip mold or bead, comprising a substantially rectangular center panel substantially conforming to the shape of the top to be covered, a downturned marginal edge stitched about the cover and adapted to fit snugly and smoothly over said bead and provided along its lower edge with a pocket, and a flexible reinforcing means inserted through the pocket and comprising an inelastic flexible element which extends about three sides of the cover and an elastic element which extends partway across the fourth side of the cover, and is connected to the ends of the inelastic flexible element the reinforcing means being disposed and positioned to interlock under the drip mold or bead of the car top to be covered.

2. A slip-on cover for automobile tops having a drip mold or bead, which comprises a substantially rectangular waterproof fabric cover corresponding substantially to the shape of the top to be covered, a downturned edge stitched to the marginal edge of the cover and having its lower portion upturned inwardly and stitched to form a continuous uninterrupted pocket, said edge being adapted throughout to fit snugly and smoothly over the drip mold or bead, a reinforcing wire extending through said pocket about one end and both side edges and around the corners at the other end of the cover, and a coil spring of small diameter interposed in said pocket across the last mentioned end of the cover and connected to the ends of said wire, said spring and wire being adapted when the cover is in place to interlock under the bead or drip mold and said pocket being shaped to fit snugly about the wire and loosely about the spring.

3. A slip-on cover for automobile tops having a drip mold or bead, which cover is substantially rectangular in shape and formed to lie flat over the automobile top and to fit snugly and smoothly about the entire bead of the automobile top, the marginal edge of the cover which fits over said bead, being provided about its lower edge with a very small concealed flexible but non-expansible reinforcing element which extends continuously across one end and along the two sides and partway across the other end at each side, and an elastic element incorporated in the latter end of the cover and connecting the ends of said reinforcing element, said elastic element being interposed to permit the edge of the cover to be stretched over the bead or drip mold and then to contract about the latter, affording a smooth unwrinkled fit for the edge of the cover over the drip mold or bead under which said reinforcement is adapted to engage.

In testimony whereof I affix my signature.

HUBERT GLOVER.